(12) United States Patent
Locker et al.

(10) Patent No.: US 8,509,852 B2
(45) Date of Patent: Aug. 13, 2013

(54) CELLULAR COMMUNICATION AUTO REDIAL FOR DROPPED CALL

(75) Inventors: Howard J. Locker, Cary, NC (US); Axel Ramirez Flores, Durham, NC (US); Bradley Park Strazisar, Cary, NC (US); James Stephen Rutledge, Durham, NC (US); Jennifer Greenwood Zawacki, Hillsborough, NC (US); Michael Thano Matthews, Cary, NC (US); Scott Edwards Kelso, Cary, NC (US); Steven Richard Perrin, Raleigh, NC (US); Yi Zhou, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 12/968,859

(22) Filed: Dec. 15, 2010

(65) Prior Publication Data

US 2012/0157164 A1 Jun. 21, 2012

(51) Int. Cl.
*H04B 1/38* (2006.01)

(52) U.S. Cl.
USPC ......... 455/564; 455/452.2; 455/466; 455/450

(58) Field of Classification Search
USPC .................. 455/67.13, 263, 336, 423, 67.11, 455/115.1, 226.1–226.4, 401, 422.1, 450, 455/452.1, 452.2, 564, 565, 460, 404.2, 456.1–457, 455/412.1, 412.2, 414.1, 466, 550.1; 340/539.13; 370/351, 328; 709/206, 207, 709/232, 238–245; 705/32, 34, 40
See application file for complete search history.

(56) References Cited

U.S. PATENT DOCUMENTS

| | | | |
|---|---|---|---|
| 5,408,683 A * | 4/1995 | Ablay et al. | 455/433 |
| 6,667,962 B1 | 12/2003 | Lee et al. | |
| 6,721,572 B1 * | 4/2004 | Smith et al. | 455/456.1 |
| 6,766,173 B1 * | 7/2004 | Chun et al. | 455/450 |
| 2004/0157606 A1 | 8/2004 | Lee | |
| 2008/0020748 A1 | 1/2008 | Parker et al. | |
| 2008/0248795 A1 * | 10/2008 | Petersen et al. | 455/423 |
| 2011/0034159 A1 * | 2/2011 | Philmon et al. | 455/418 |

* cited by examiner

*Primary Examiner* — Patrick Edouard
*Assistant Examiner* — Ronald Eisner
(74) *Attorney, Agent, or Firm* — Schwegman, Lundberg & Woessner, P.A.

(57) ABSTRACT

A device and method include detecting signal strength received at a mobile cellular communication device. A dropped call is detected between the device and another device as a function of detected signal strength. The dropped call is reconnected when detected signal strength reaches a selected first threshold.

15 Claims, 2 Drawing Sheets

CELLULAR COMMUNICATION AUTO REDIAL FOR DROPPED CALL

BACKGROUND

Cellular communications may be interrupted and dropped due to many different reasons. In some cases, poor cellular coverage may lead to dropped calls. Calls may need to be manually restarted by a user when coverage is acceptable and sufficient to support the calls.

SUMMARY

A device and method include detecting signal strength received at a mobile cellular communication device. A dropped call is detected between the device and another device as a function of detected signal strength. The dropped call is reconnected when detected signal strength reaches a selected first threshold.

DETAILED DESCRIPTION

Figure 1:
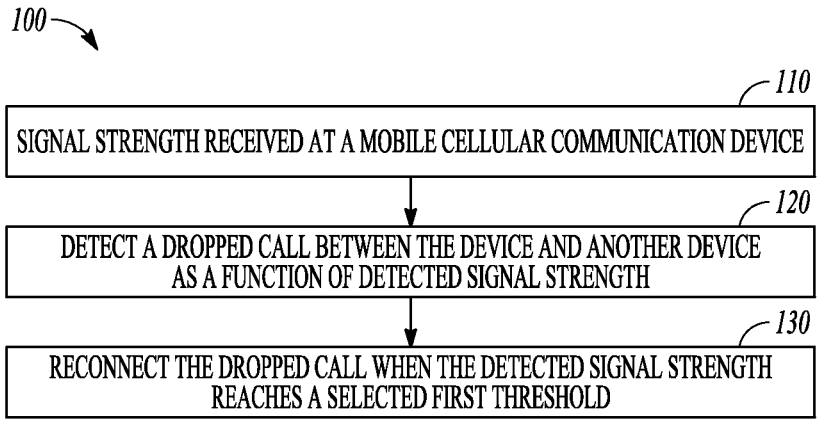
FIG. 1 is a flowchart illustrating a method of reconnecting dropped calls according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may also take the form of one or more apps that run on processors of mobile cellular devices such as a smart phones, cell phones, or other devices and may alternatively be executed on a digital signal processor, ASIC, microprocessor, or other type of processor operating on a computer system, such as a personal computer, tablet, laptop computer, server, or other computer system.

A system and method monitors signal strength to determine if a cellular communication device, such as a cell phone, is in an area with adequate cellular coverage. If a call to another device ends prior to a user purposely ending the call on the device, and the signal strength is below a selected threshold, it is determined that the call was dropped. In one embodiment, when signal strength is greater than the threshold, the system and method automatically redials the other device to reestablish the call.

In further embodiments, a message may be prepared to inform the other device and user of that device that signal quality is decreasing and the call may be dropped. The message may ask if the other device would like the call to be reestablished when signal strength returns to the device. The other device, or user of that device may then select whether to be recalled or not by providing their selection via a communication back to the device that had the call dropped due to inadequate coverage. The messages may be exchanged as SMS (short message service) messages, or other forms as desired.

In still further embodiments, fast drop offs in coverage may result in insufficient time to generate and send a message warning that a call may be dropped. To handle such fast drop-offs in coverage, a database of weak coverage areas, referred to commonly as dead zones, may be maintained. The position and path of the device may be monitored and used to generate and send the message prior to coverage dropping as the device approaches a dead zone. In still further embodiments, devices may provide feedback to update the database regarding encountered dead zones that are not in the database, as well as dead zones in the database that may no longer be dead zones due to network changes, such as the provision of additional cellular towers. Such dead zones that are no longer dead zones may be removed from the database, while new dead zones may be added.

A method reconnecting dropped calls is illustrated at 100 in FIG. 1. Method 100 includes detecting signal strength received at a mobile cellular communication device at 110. At 120, the method detects a dropped call between the device and another device as a function of detected signal strength. In some embodiments, the detection 120 also includes whether or not a call end function has been selected by a user of the device. In further embodiments, the dropped call may be detected by lack of receipt of messages from a cellular station handling the call. At 130, the dropped call may be reconnected when the detected signal strength reaches a selected first threshold. The first threshold in one embodiment is a signal strength known to provide a stable call that is not likely to be dropped. It may be adjusted in various embodiments based on user preferences. Higher thresholds result in a higher probability that a call will be maintained, whereas lower thresholds may result in a call being established more quickly following a drop, as the mobile device moves out of a deadzone. In such cases, the signal strength is likely to keep increasing, resulting in a stable call that may be made earlier than one that is subject to a higher threshold for reestablishing the call.

Figure 2:
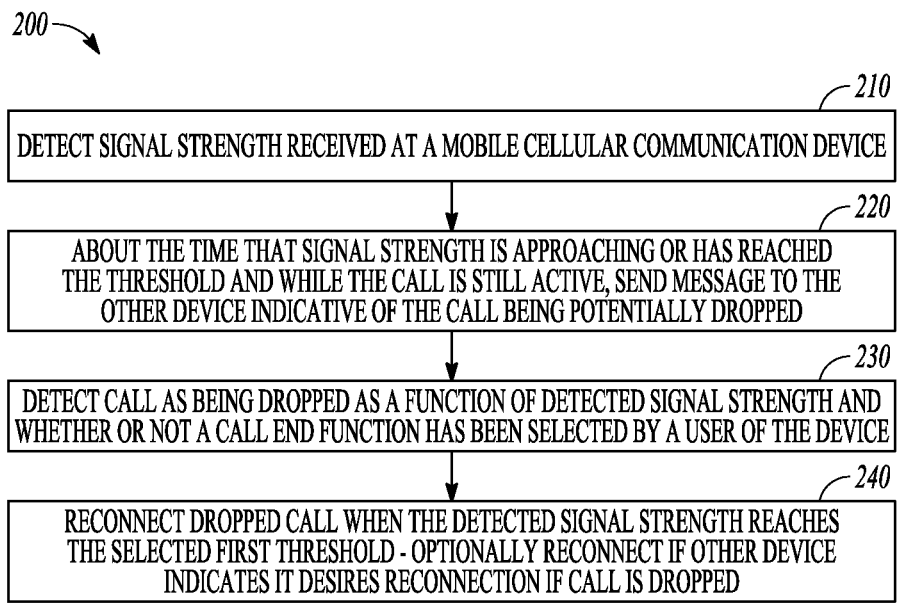
FIG. 2 is a flowchart illustrating a further method of reconnecting dropped calls including sending a message when a call is likely to be dropped according to an example embodiment.

In a further method illustrated at 200 in FIG. 2, a signal strength received at a mobile cellular communication device is detected at 210. At 220, about the time that signal strength is approaching or has reached the threshold and while the call is still active, a message is sent to the other device indicative of the call being potentially dropped. At 230, the call is detected as being dropped as a function of detected signal strength. In some embodiments, the detection 230 also includes whether or not a call end function has been selected by a user of the device. In further embodiments, the dropped call may be detected by lack of receipt of messages from a cellular station handling the call. At 240, the dropped call may be reconnected when the detected signal strength reaches the selected first threshold. In yet a further embodiment, the message is sent at 220 when the detected signal strength falls below a selected second threshold. In some embodiments, the device may receive a message from the other device responsive to the message 220 specifying whether or not to attempt to reconnect. The method at 240 will then either attempt to reconnect or not depending on a preference of the other device.

Figure 3:
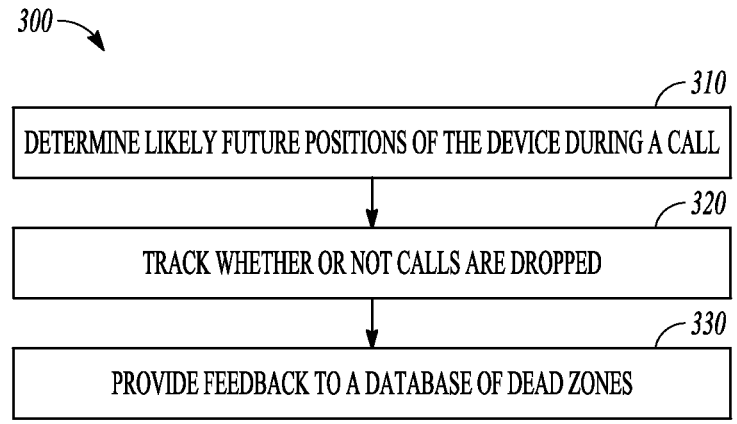
FIG. 3 is a flowchart illustrating a method of reconnecting dropped calls including likely future positions of a mobile cellular device according to an example embodiment.

A method 300 in FIG. 3 is illustrated in flowchart form. The method includes determining likely future positions of the device at 310 during a call. The likely future positions of the device may be compared to a database of dead zone locations. Actual positions of the device for use in extrapolating likely future positions may be detected by either triangulation between towers, global positioning system information, or a combination of both. When it appears that a device may be about to enter into a dead zone, a message is sent as a function of the likely future positions and the dead zone locations. Likely future positions may be extrapolated from previous positions and times at the previous positions. At 320, the mobile device tracks whether or not calls are dropped, and provides feedback to a database of dead zones at 330. If calls are not dropped in deadzones in the database, the information may be used by the database to update perimeters of deadzones in the database or remove the deadzones completely if messages from multiple mobile communication devices indicate that the former deadzone is no longer a deadzone. This may occur where new cellular transmitter have been installed that now cover the deadzones. In still further embodiments, messages indicating where dropped calls have occurred and been restablished provide valuable information about new deadzones to add to the database.

Figure 4:
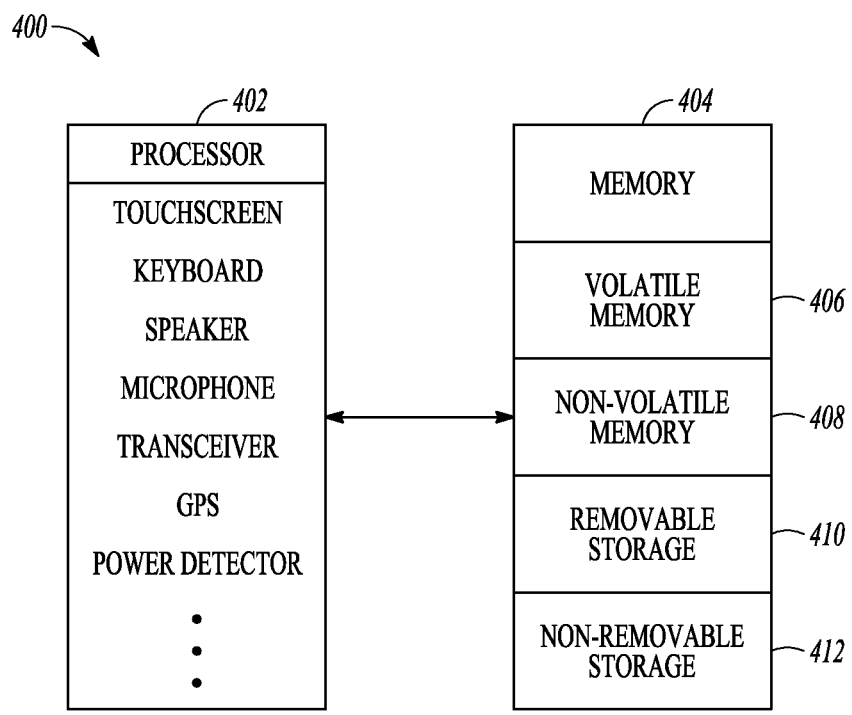
FIG. 4 is a flowchart illustrating a method of reconnecting dropped calls according to an example embodiment.

A block diagram of a mobile communication device that executes programming for performing the above algorithms is shown in FIG. 4. A general computing device in the form of one or more microprocessors or microcontrollers represented at 410, may include a processing unit 402, memory 404, removable storage 412, and non-removable storage 414. Memory 404 may include volatile memory 406 and non-volatile memory 408, such as memory cards. Device 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, or any other medium capable of storing computer-readable instructions. Device 410 may also include touchscreens, keyboards, speakers, microphones, transceivers, GPS receivers, power detectors, and other devices found in mobile cellular communication devices. Computer-readable instructions stored on a computer-readable medium are executable by the processing unit 402 of the computer 410.

The invention claimed is:

1. A method comprising:
    detecting signal strength received at a first mobile cellular communication device during an active call between the first mobile cellular communication device and a second mobile cellular communication device;
    in response to the detected signal strength being below a predetermined first threshold, detecting the call could potentially be dropped, and sending a first message to the second device related to such drop;
    in response to the detected signal strength received at the first device being below a predetermined second threshold and a call end function not being selected by a user of the first device, sending a second message to the second device prompting a user of the second device to select whether to reestablish the call in response to the signal strength received at the first device increasing; and
    based on a selection of the user of the second device in response to the prompting, reconnecting the dropped call only if the detected signal strength received at the first device reaches a predetermined third threshold, wherein the third threshold is a signal strength known to provide a stable call that is not likely to be dropped.

2. The method of claim 1 and further comprising:
    determining likely future positions of the first device;
    comparing the likely future positions of the first device to a database of dead zone locations; and
    sending the first message as a function of the likely future positions and the dead zone locations.

3. The method of claim 2 and further comprising:
    determining whether calls were dropped in areas corresponding to the dead zones; and
    providing feedback for use in updating the database.

4. The method of claim 2 wherein the likely future positions are extrapolated from previous positions and times at the previous positions.

5. The method of claim 4 wherein positions of the first device are detected by one or more of triangulation between towers and global positioning system information.

6. The method of claim 1 and further comprising receiving a message from the second device specifying whether to attempt to reconnect.

7. A computer readable storage device for storing programming code to cause a communication device to execute a method, the method comprising:
    detecting signal strength received at a first mobile cellular communication device during an active call between the first device and a second mobile cellular communication device;
    in response to the signal strength being below a predetermined first threshold, detecting the call could potentially be dropped, and sending a first message to the second device related to such drop;
    in response to the detected signal strength received at the first device being below a predetermined second threshold and a call end function not being selected by a user of the first device, sending a second message to the second device prompting a user of the second device to select whether to reestablish the call in response to the signal strength received at the first device increasing; and
    based on a selection of the user of the second device in response to the prompting, reconnecting the dropped call only if the detected signal strength received at the first device reaches a predetermined third threshold, wherein the third threshold is a signal strength known to provide a stable call that is not likely to be dropped.

8. The computer readable storage device of claim 7 wherein the method further comprises:
    determining likely future positions of the first device;
    comparing the likely future positions of the first device to a database of dead zone locations; and
    sending the first message as a function of the likely future positions and the dead zone locations.

9. The computer readable storage device of claim 8 wherein the method further comprises:

determining whether calls were dropped in areas corresponding to the dead zones; and providing feedback for use in updating the database.

10. The computer readable storage device of claim 8 wherein the likely future positions are extrapolated from previous positions and times at the previous positions.

11. The computer readable storage device of claim 10 wherein positions of the first device are detected by either triangulation between towers, global positioning system information, or a combination of both.

12. The computer readable storage device of claim 7 wherein the method further comprises receiving a message from the second device specifying whether or not to attempt to reconnect.

13. A first mobile cellular communication device comprising:
- a module to detect signal strength received during an active call between the first device and a second mobile cellular communication device;
- a module to, in response to the signal strength being below a predetermined first threshold, detect the call could potentially be dropped, and send a first message to the second device related to such drop;
- a module to, in response to the detected signal strength received at the first device being below a predetermined second threshold and a call end function not being selected by a user of the first device, send a second message to the second device prompting a user of the second device to select whether to reestablish the call in response to the signal strength received at the first device increasing; and
- a module to, based on a selection of the user of the second device in response to the prompt, reconnect the dropped call only if the detected signal strength received at the first device reaches a predetermined third threshold, wherein the third threshold is a signal strength known to provide a stable call that is not likely to be dropped.

14. The device of claim 13 and further comprising:
- a module to determine likely future positions of the first device;
- a module to compare the likely future positions of the first device to a database of dead zone locations; and
- wherein the module to send the first message, sends the message as a function of the likely future positions and the dead zone locations.

15. The device of claim 14 and further comprising:
- a module to determine whether calls were dropped in areas corresponding to the dead zones; and providing feedback for use in updating the database.

* * * * *